United States Patent [19]

Hudspeth

[11] Patent Number: 4,987,441
[45] Date of Patent: Jan. 22, 1991

[54] COMPACT HAND-HELD APPARATUS FOR COPYING AN ILLUMINATED IMAGE

[75] Inventor: William Hudspeth, Norwell, Mass.
[73] Assignee: Polaroid Corporation, Cambridge, Mass.
[21] Appl. No.: 202,480
[22] Filed: Jun. 6, 1988
[51] Int. Cl.⁵ .............................................. G03B 27/50
[52] U.S. Cl. .......................................... 355/50; 355/1; 355/71; 355/210
[58] Field of Search .................... 355/8, 14 R, 71, 75, 355/21, 1, 67, 46; 358/296, 300

[56] References Cited

U.S. PATENT DOCUMENTS

| | | | |
|---|---|---|---|
| 3,415,644 | 12/1968 | Land | 354/86 |
| 3,594,165 | 7/1971 | Rogers | 354/86 |
| 3,677,633 | 7/1972 | Huber | 355/8 X |
| 3,753,392 | 8/1973 | Land | 354/86 |
| 4,175,844 | 11/1979 | Glaser-Inbari | 354/110 |
| 4,264,130 | 4/1981 | Ogura | 350/96.25 |
| 4,666,293 | 5/1987 | Kingsland et al. | 355/75 |
| 4,719,493 | 1/1988 | Maiorano | 355/1 |
| 4,728,994 | 3/1988 | Spinelli et al. | 355/71 |
| 4,801,969 | 1/1989 | Hamidian | 355/71 |

OTHER PUBLICATIONS

Polaroid Technical Publication, DS-34, Direct Screen Instant Camera, 11/87.

Primary Examiner—L. T. Hix
Assistant Examiner—D. Rutledge
Attorney, Agent, or Firm—John J. Kelleher

[57] ABSTRACT

A portable and highly compact copier for photographically copying a selected portion of an illuminated image. The copier includes a lighttight housing having an opening therein and having a support for temporarily maintaining photosensitive material at a focal plane within the copier housing. An array of image-transferring cylindrical microlenses, each microlens having an image end and an object end, is slidably mounted in the housing opening with the image ends adjacent the focal plane and with the object ends facing outwardly of the copier housing opening. An electrical drive motor is provided which is mechanically coupled to the microlens array. A self-retracting shade arrangement forms a slidable lighttight seal between the microlens array and structure forming the housing opening such that all of the light passing though the housing opening and to the copier housing focal plane must pass through the microlens array. When the drive motor is actuated, the microlens array coupled thereto is driven across the housing opening to thereby cause an illuminated image located at the copier housing opening to be transferred to the housing focal plane and to photosensitive material positioned thereat.

18 Claims, 7 Drawing Sheets

PRIOR ART

COMPACT HAND-HELD APPARATUS FOR COPYING AN ILLUMINATED IMAGE

BACKGROUND OF THE INVENTION

The present invention relates to hand-held apparatus for photographically copying a portion of an illuminated image, in general, and to such apparatus for copying a portion of a back-lighted photographic film transparency, in particular.

At the present time there is a fairly large and unmet need for relatively simple, portable and compact apparatus that is capable of expeditiously making a photograph or hard copy of all or a selected portion of an illuminated transparent image. In the medical field, for example, in many instances it is a normal practice to make a multiple image set of X-rays or film transparencies of selected views of a patient's anatomy in order to provide a treating (or consulting) physician with an additional tool for diagnosing the patient's illness. Standard practice in such instances is to provide a single copy of each anatomical view produced by X-ray or other imaging means, for inclusion in the patient's case file.

Typically, a treating physician views 14×17 inch transparencies wherein each transparency includes a single X-ray image or multiple smaller images produced either by Computed Tomography (CT) or Magnetic Resonance Imaging (MRI). In many (if not all) instances, the treating physician would like to have a copy of one or two individual images or portions thereof per case that best establishes the diagnosis of pathology (or normalcy) for his own records and for the records of a consulting physician. It is only in rare instances where a physician needs a complete imagery set for his own records. To obtain such individual images today is an unwieldy, time consuming and expensive process, even at a very large medical facility, and is therefore rarely used.

There is a major disadvantage associated with a physician's inability to promptly obtain a copy of selected portions of his or her patient's diagnostic images. These images theoretically belong to the patient, and in a medical facility access to them is controlled by the radiology department. With very large numbers of diagnostic image sets to take care of, it is not uncommon for the radiology department in such a facility to lose or temporarily misplace a substantial number of the diagnostic images placed in its care. Therefore, if a physician is not able to obtain a copy of the pertinent images during the relatively short period of time that he has personal contact with the entire case file, i.e., while he is diagnosing or formally consulting, it is highly unlikely that he will have easy access to those images at some time in the future. The lack of easy and repeated access to a patient's diagnostic images is a fairly common problem in the medical field.

A portable, hand-held system for photographing an illuminated image, such as that on the face of a cathode ray tube (CRT) is presently in existence. This system is sold by Polaroid Corporation of Cambridge, Mass., under their trademark DS-34 Direct Screen Instant Camera. This camera system is designed for oscilloscopes or other apparatus having CRT displays that do not have built-in photographic capability. The camera includes conventional optical and exposure control systems and is provided with a plurality of snap-on hoods, having built-in corrective optics, that both prevent ambient light reflections from reaching the camera lens and make the camera compatible with much of the CRT equipment that is currently available. A major disadvantage of this camera system is its relatively large size, a size that is primarily dictated by its conventional optics and camera hoods. Though portable, this system is too bulky for a user such as a physician to conveniently carry around for any extended period of time.

SUMMARY OF THE INVENTION

In accordance with the present invention, portable, battery operated, highly compact apparatus for photographically copying a selected portion of an illuminated image is provided. The apparatus includes a lighttight housing having an opening therein and having means for positioning photosensitive material at a focal plane within said housing. An array of image-transferring microlenses, each microlens having an image end and an object end, is slidably mounted on said apparatus with the image ends adjacent said focal plane and with the object ends facing outwardly of said housing opening. Drive means are coupled to said microlens array. In addition, means are provided for maintaining a slidable lighttight seal between said array and structure forming said housing opening such that any light passing through said opening and to said focal plane must pass through said microlens array. When said drive means are actuated, the microlens array coupled thereto is driven across said housing opening to thereby cause an illuminated image located at said housing opening to be transferred to said housing focal plane and to photosensitive material positioned thereat.

It is a primary object of the present invention, therefore, to provide portable and highly compact apparatus for expeditiously copying a selected portion of an illuminated image.

It is another object of the present invention to provide portable and highly compact apparatus for photographically copying a portion of a back-lighted film transparency of various views of internal structure or organs of the human anatomy.

It is a further object of the present invention to provide portable and highly compact illuminated image copying apparatus that can readily be carried in or on the clothing of a camera operator when not being employed for image-copying purposes.

Other objects, features and/or advantages of the present invention will be readily apparent from the following detailed description of a preferred embodiment thereof when taken in conjunction with the accompanying drawings.

DESCRIPTION OF A PREFERRED EMBODIMENT

Figure 1:
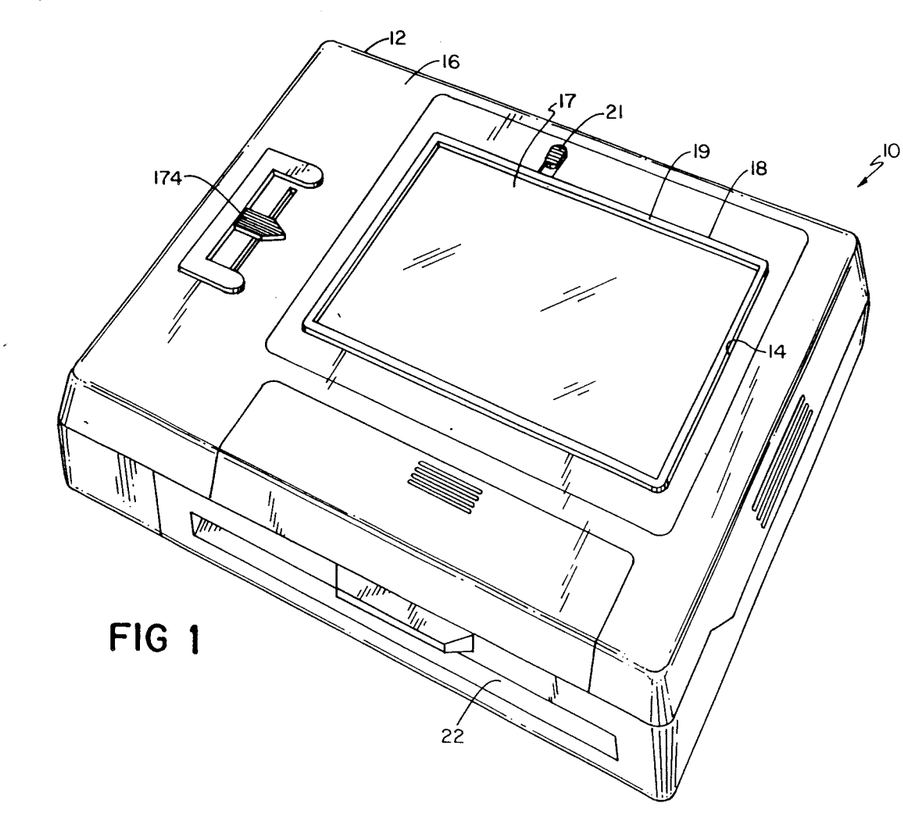
FIG. 1 is a perspective view of the compact illuminated-image copying apparatus of the present invention.

In FIG. 1, numeral 10 generally indicates portable and highly compact apparatus, employing a preferred embodiment of the present invention, for photographically copying a selected portion of an illuminated image. As shown in FIG. 1, the apparatus 10 includes a housing 12 having a generally rectangular opening 14 formed in an upper wall 16 thereof that provides the only external opening through which light from an illuminated image may pass for image copying purposes. Opening 14 in the upper wall 16 of the housing 12 is adapted to receive a readily demountable neutral-density filter 17 whose primary functions are to act, in effect, as a supplementary stop-reducing device in order to uniformly attenuate the intensity of illuminated image light radiating through the opening 14 and to prevent the passage of unwanted foreign matter or objects therethrough.

The filter 17 includes a support frame 18 that projects beyond or outward from the adjacent structure forming the housing opening 14 when the filter 17 is fully inserted in the opening 14. An outer facing surface 19 of the support frame 18 establishes a plane for locating an illuminated transparent image at the housing opening 14. The surface 19 is highly polished so that it does not scratch and thereby damage the located transparent image. The filter 17 is maintained in the housing opening 14 in a conventional manner, by a pair of fingers (not shown) at opposite sides of the filter frame 18. One finger projects from one side of the frame 18 and engages a cooperating recess (not shown) in the housing 12 adjacent the housing opening 14. Another finger is pivotally mounted in the housing 12 adjacent an opposite side of the frame 18 for engagement with a recess (not shown) in said filter frame 18. This other finger is spring-force biased to its engaged position and is rotated out of said engaged position by the movement of a lever 21, coupled thereto, toward the filter 17. The lever 21 includes a cam surface (not shown) that engages a lower surface of the frame 18 and partially lifts the filter 17 out of the opening 14 in housing 12 for ready removal and/or replacement. Housing 12 also includes a light-sealed slot 22 through which a later to be described exposed film unit is advanced into ambient light after an illuminated image present at housing opening 14 has been transferred to the film unit by the apparatus 10.

Figure 2:
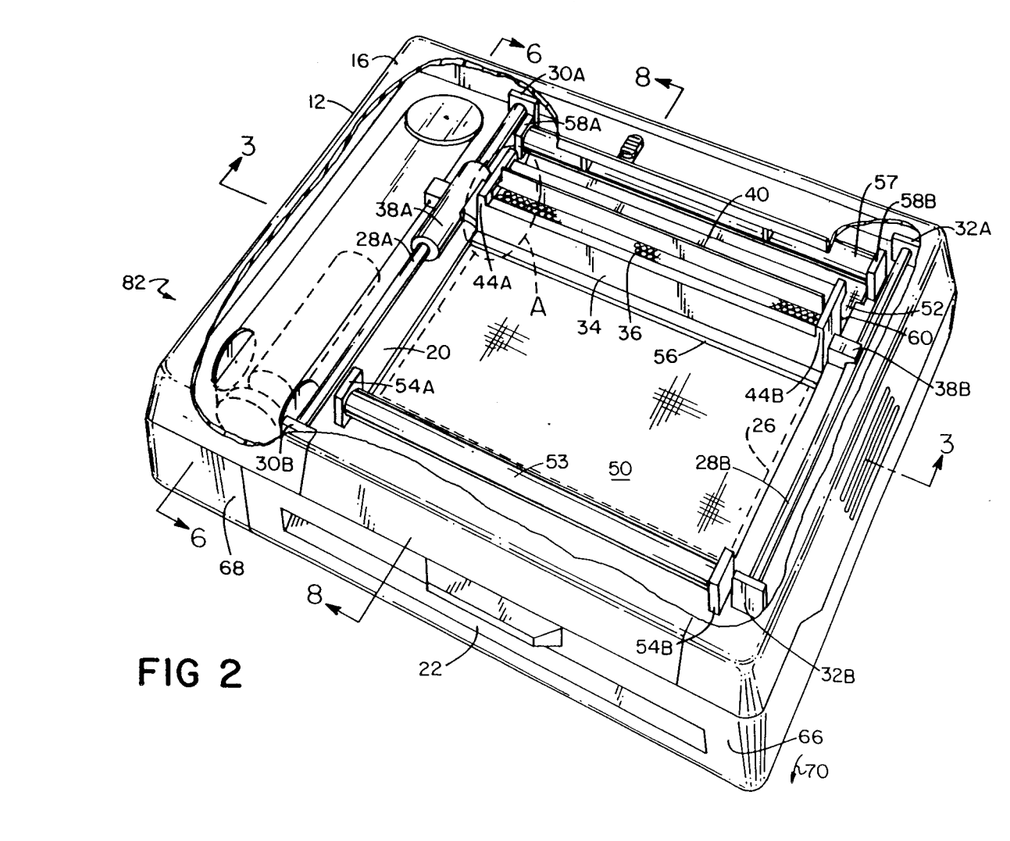
FIG. 2 is the same view as that shown in FIG. 1 except that the top is broken away to facilitate describing internal portions thereof.
Figures 3, 4:
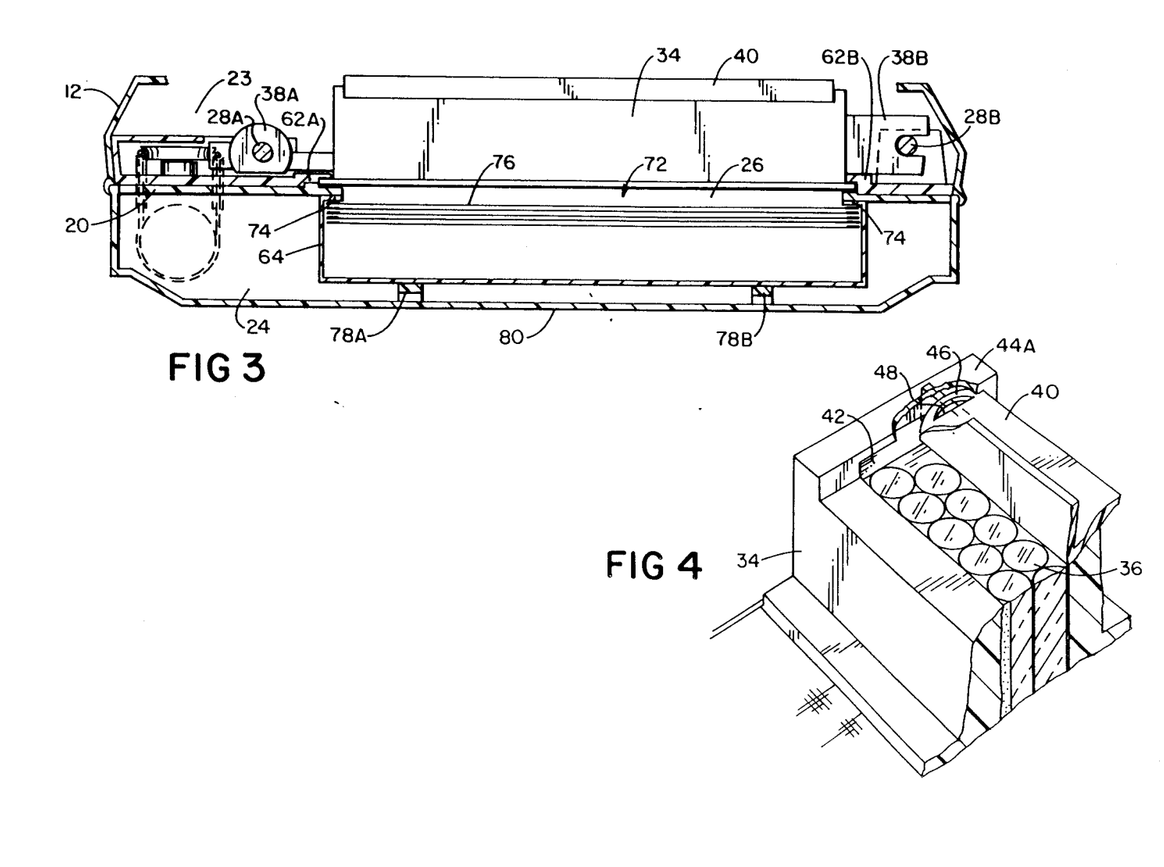
FIG. 3 is a sectional view taken on the line 3—3 in drawing FIG. 2.
FIG. 4 is an enlarged view of detail A shown in drawing FIG. 2.

Reference should now be made to FIG. 2 which is the same as FIG. 1, except that the upper wall 16 has been broken away to facilitate describing internal portions of the copying apparatus 10, and to FIG. 3 which is a sectional view taken on the line 3—3 in said drawing FIG. 2. As shown in FIGS. 2 and 3, the copying apparatus 10 includes an intermediate wall 20 that is spaced from and generally parallel to said upper wall 16, a wall that divides the interior of the housing 12 into an upper chamber 23 and a lower lighttight chamber 24. Intermediate wall 20 includes an opening 26 that is approximately the same size as the opening 14 (FIG. 1) in upper wall 16 and is in registration therewith.

Linear guide rods 28A and 28B, of circular cross-section, are mounted in a fixed position to the intermediate wall 20 on opposite sides of the intermediate wall opening 26. Rods 28A and 28B are mounted parallel to one another and generally parallel to an adjacent side of the rectangular opening 26. Rod 28A is mounted to the wall 20 by a pair of bosses 30A and 30B, while rod 28B is mounted to the wall 20 by a similar pair 32A and 32B. A lens assembly 34 and microlens array 36 forming a part thereof is slidably supported on the guide rods 28A and 28B by a pair of guides 38A and 38B, respectively. Lens array 36 is a commercially available lens strip and is comprised of a plurality of miniature, image-forming cylindrical lenses that are optically aligned and rigidly mounted with respect to one another. The function of the array 36 is to transfer an illuminated image located at an object plane adjacent the object end of said array to an image or focal plane in the lower lighttight chamber 24, at the opposite or image end of said array, within a relatively short distance. One such lens array is sold by NSG America, Inc. of Somerset, N.J. under their registered trademark SELFOC. The characteristics of the microlens array 36 will be described below in greater detail.

A cover member 40 is slidably mounted on the lens assembly 34 for movement therewith. With additional reference to FIG. 4, which is an enlarged view of detail A shown in drawing FIG. 2, one end of the cover member 40 is slidably mounted within a recess 42 located in a flange 44A projecting from one end of the microlens assembly 34 and the other end of the cover member 40 is similarly mounted within a corresponding recess (not shown) in flange 44B projecting from the other end of the microlens assembly 34. As shown in FIG. 4 with respect to one end of thereof, each end of the cover member 40 includes an integral spring portion 46 constructed by making the ends thereof arcuate and forming an arcuate opening 48 near each of the ends of the cover member 40. When the arcuate ends of the cover member 40 are fully inserted into their respective recesses in the flanges 44A and 44B, each end of the cover member 40 is placed in frictional engagement with the bottom surface of their respective flange recess. This frictional engagement maintains the positional relationship between the cover member 40 and the lens array 36 when the lens assembly 34 is driven along the guide rods 28A and 28B and across the intermediate wall opening 26.

A pair of shades 50 and 52, each formed from a sheet of flexible opaque material such as a rubber coated sheet of polyester or the like are retractably mounted on intermediate wall 20 with each shade covering varying portions of the intermediate wall opening 26. Shade 50 has one end attached to and wrapped on a torsion-spring-biased rod (not shown) to form a roll 53 that is, in turn, rotatably mounted on the intermediate wall 20 by a pair of bosses 54A and 54B, adjacent a side of the rectangular shaped intermediate wall opening 26 that is generally perpendicular to the guide rods 28A and 28B.

The other end of the shade 50 is attached to a flange 56 laterally extending from the bottom of the lens assembly 34, in a lighttight relation. Similarly, the shade 52 has one end attached to and wrapped on a torsion-spring-biased rod (not shown) to form a roll 57. This rod is, in turn, rotatably mounted on the intermediate wall 20 by a pair of bosses 58A and 58B, adjacent that side of the intermediate wall opening 26 directly opposite from the side of the opening that is adjacent to the roll 53. The other end of the shade 52 is attached in a lighttight relation to a flange 60 that laterally extends from the bottom of the lens assembly 34 in a direction opposite to that of the flange 56. The torsion-spring-biased rods rotatably supporting the end of either the shade 50 or the shade 52 maintain a tension force on each of the shades and provide the force that wraps these shades onto their respective support rods to form the rolls 53 or 57 when the lens assembly 36, attached to the opposite end of each of the shades, is driven across the opening 26.

With reference to drawing FIG. 3, the sides of the shades 50 and 52 are maintained in lighttight sliding contact with those portions of the upper surface of the intermediate wall 20 adjacent the opening 26, in part, by a pair of labyrinth defining flanges 62A and 62B. In addition, the length of the flanges 62A and 62B are substantially longer than the respective lengths of the adjacent sides of the opening 26 so that those portions of the shades 50 and 52 being wrapped onto or unwrapped from their respective torsion-spring-biased support rods will also be maintained in lighttight sliding engagement with those portions of the upper surface of the intermediate wall 20 adjacent the opening 26. The relationship between the lens assembly 34, the shades 50 and 52 and the structure forming the opening 26 in the intermediate wall 20 is such that any light passing through the opening 26, including the period when the lens assembly 34 is driven across the opening 26, can only pass through the microlens array 36 in the lens assembly 34.

The copying apparatus 10 incorporates a recess therein for accepting a multiple film unit cassette 64 (FIG. 3). Access to this recess is gained by a pivoting panel 66, forming a portion of a sidewall 68 of the housing 12, in a direction 70 as shown in drawing FIG. 2. Cassette 64 incorporates a stack of film units 72 which are spring-biased toward an upper wall 74 thereof by spring means (not shown) so as to locate an uppermost film unit 76 in the focal plane within the housing 12 or in an exposure position adjacent the opening 26 in the intermediate wall 20. Film units 72 are of the integral, self-developing type, each including a rupturable pod of processing liquid at their leading end and a trap at their trailing end for receiving any excess processing liquid, as is well known in the art. For a more detailed description of integral film units of the type employed herein, reference may be had to U.S. Pat. No. 3,415,644 issued to E. H. Land on Dec. 10, 1968 and U.S. Pat. No. 3,594,165 issued to H. G. Rogers on July 20, 1971. Copying apparatus 10 includes a pair of rails 78A and 78B on an interior surface of a bottom wall 80 of the housing 12 for supporting the film cassette 64 in position for the sequential exposure of the film units 72.

Figure 5:
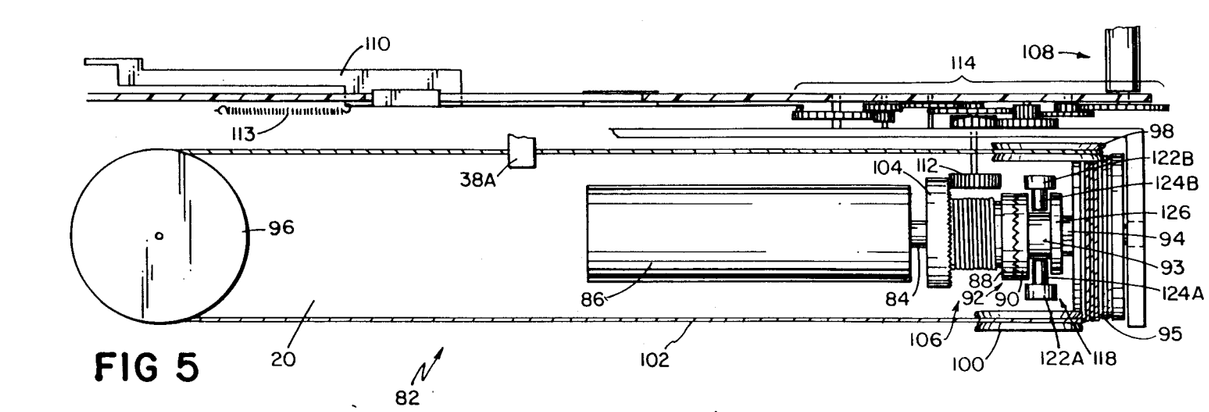
FIG. 5 is an enlarged top view of the microlens array drive mechanism as shown in drawing FIG. 2.

Apparatus for driving the lens assembly 34 across the intermediate wall opening 26 and for advancing an exposed film unit into the bite of a pair of juxtaposed processing rollers for film unit processing and for delivery of a processed film unit to a user of the copying apparatus 10 is shown at 82 in drawing FIG. 2. An enlarged top view of the drive apparatus 82 is shown in drawing FIG. 5. As shown in FIG. 5, the rotational motion of an output shaft 84 of a reversible DC motor 86 is coupled to the lens assembly 34 through a first power transmitting path and to exposed film unit advancing apparatus through a second completely independent power transmitting path from a common drive or face gear 88.

Figures 7, 7A:
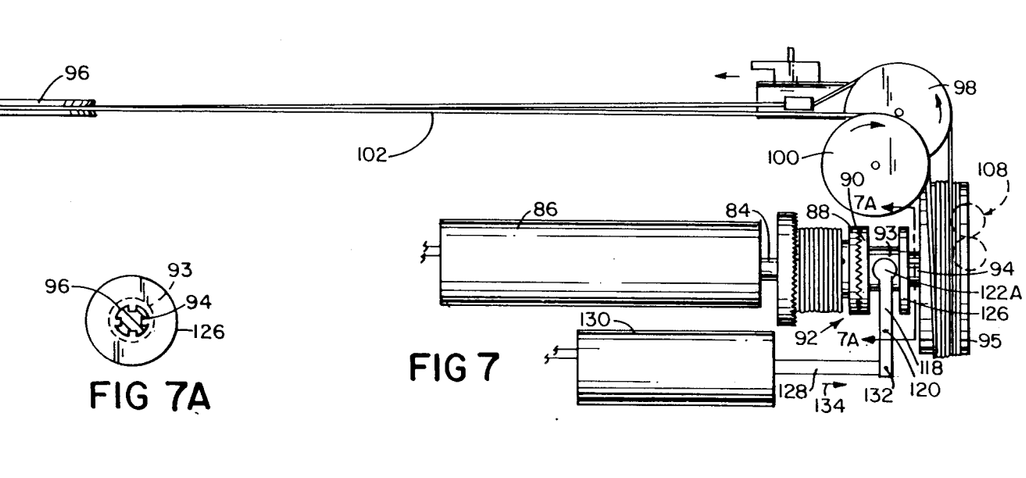
FIG. 7 is an enlarged partial elevational view, taken on the line 6—6 in drawing FIG. 2, showing the drive motor coupled to the microlens array.
FIG. 7a is a sectional view taken on the line 7A—7A in drawing FIG. 7.

In FIG. 5, the gear 88 and another gear 90 form a two-way clutch 92 for transmitting rotational motion in either of two directions. Face gear 88 is mounted in a fixed position on the motor output shaft 84. Face gear 90 is mounted for free rotation about the axis of rotation of the shaft 84, forms an integral part of a collar 93, and is coupled by a spline shaft 94 that is integral with the collar 93, to a capstan 95. A sectional view of the spline shaft 94 taken along the line 7A-7A in drawing FIG. 7 is shown in drawing FIG. 7A. As shown in FIG. 7A, the longitudinal ridges 96 in the spline shaft 94 engage corresponding longitudinal grooves (not shown) in the capstan 95 for sliding engagement therewith. Clutch 92 is actuatable between a state where the rotational motion of the shaft 84 is coupled to the capstan 95 and to a state where it is not. A set of idler pulleys 96, 98 and 100 are mounted for rotation on the wall 20 or on a wall (not shown) projecting upwardly at right angles from the wall 20. A length of stainless steel cable 102 is attached at each end to the capstan 95 and is tautly wrapped around capstan 95 and pulley set 96, 98 and 100. In addition, the guide 38A of the lens assembly 34 is attached to the cable 102 in a fixed relation. In the first power transmitting path, when clutch 92 is actuated to its coupled state, the rotational motion of the shaft 84 is coupled to the lens assembly 34 through the capstan 95, the cable 102 and the guide 38A.

In the second power transmitting path, a face gear 104 is mounted for rotation in a single direction about the rotational axis of the motor output shaft 84. Face gear 104 is coupled to the face gear 88 by a conventional one-way or spring clutch 106. The rotational motion of the output shaft 84 is coupled to the face gear 104 by the clutch 106 when said shaft is rotated in one direction and is uncoupled from the face gear 104 when the shaft 84 is rotated in the opposite direction. Face gear 104 is coupled to a juxtaposed processing roller pair 108 (FIG. 7) and to a pick or film unit advancing arm 110 (FIG. 5) through spur gear 112 and a gear train 114 in a conventional manner, such as in the manner described in U.S. Pat. No. 3,753,392 to Land, the disclosure of which is specifically incorporated herein by reference.

As explained in much greater detail in a similar arrangement in said '392 patent, the rotational motion of the face gear 104 and the spur gear 112 is coupled to a return spring 113 biased film advancing arm 110 through one portion of the gear train 114 causing the arm 110 to reach into a slot (not shown) in the cassette 64, engage a trailing edge of an exposed film unit 76 (FIG. 3) and advance the exposed film unit through an exit slot (not shown) in the cassette 64 and into the bite of the processing roller pair 108 that is in registration with the cassette 64 exit slot. The rotational motion of the face gear 104 and the spur gear 112 is also coupled to the processing roller pair 108 through another portion of the gear train 114 causing the rollers to rupture the pod of processing liquid located at the leading edge of the exposed film unit and spread the contents thereof between photosensitive and image-receiving layers thereof while simultaneously advancing the exposed film unit through the light-sealed opening 20 in copier housing 12. Shortly after the processing liquid has been spread, a conventional gear train actuated switch (not shown) interrupts power to the drive motor 86 to terminate the rotation of the processing roller pair 108.

Figure 6:
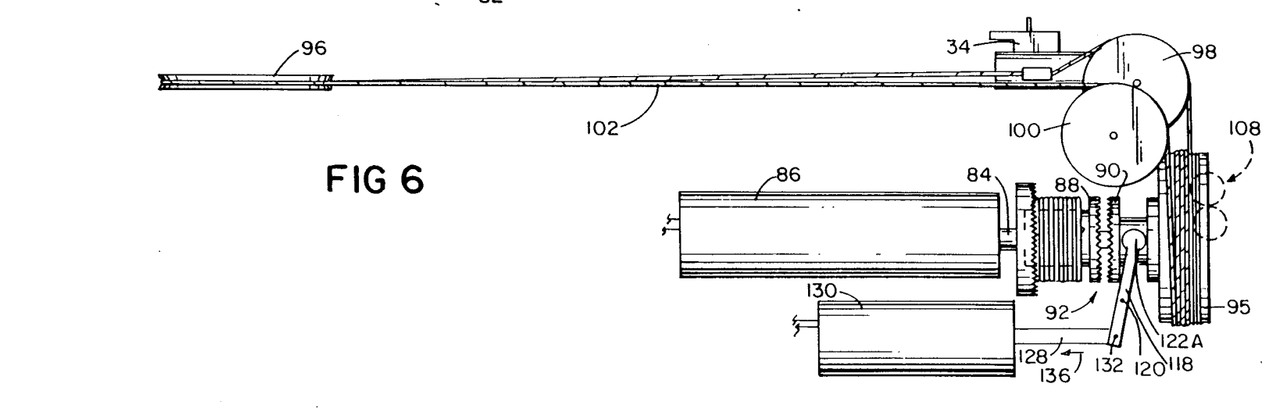
FIG. 6 is an enlarged partial elevational view, taken on the line 6-6 in drawing FIG. 2, showing the drive motor uncoupled from the microlens array.

As noted above with respect to FIG. 5, bidirectional rotation of the shaft 84 of the drive motor 86 is coupled to the capstan 95 and the lens assembly 34 (FIG. 2) by the two-way clutch 92. With additional reference to drawing FIGS. 6 and 7, prior to the initiation of a film exposure cycle, the two way clutch 92 is in its initial or uncoupled state as shown in drawing FIG. 6. FIG. 6 is an enlarged partial elevational view taken on the line 6—6 in drawing FIG. 2. As shown in FIG. 6, the face gears 88 and 90 are uncoupled from one another and therefore the motor shaft 84 is uncoupled from the capstan 94. A fork member 118 (FIGS. 6 and 7) is mounted for pivotal movement about an axis 120. One end of the fork member 118 includes a pair of prongs 122A and 122B having projections 124A and 124B respectively projecting inwardly therefrom with the projections being captured in the space that is formed between the back of the face gear 90 and a flange portion 126 of the collar 93. The bottom or opposite end of the fork member 118 is pivotally attached to an armature 128 of a solenoid 130 by a pin 132. When the solenoid 130 is energized, the clutch 92 changes from its uncoupled state, as shown in FIG. 6, to its coupled state as shown in FIG. 7. Clutch 92 changes from its uncoupled to its coupled state in the following manner. The electrical energization of the solenoid 130 causes solenoid armature 128 to move in a direction 134. This movement of the armature 128 causes the fork member 118 to pivot about the axis 120 and thereby cause the fork member projections 124A and 124B to contact the face gear 90 and move the teeth thereof into engagement with the teeth of the face gear 88. Clutch 92 remains in its coupled state only so long as solenoid 130 remains energized. Solenoid 130 includes an integral return spring (not shown). When the solenoid 130 is de-energized, the return spring pulls the armature 128 in a direction 136 (FIG. 6) into the solenoid 130 thereby causing the fork member 118 to pivot about the axis 120 and cause the projections 124A and 124B to contact the flange portion 126 of the collar 93 and uncouple the teeth of the face gear 90 from the teeth of the face gear 88.

Microlens assembly 34 is driven across the opening 26 in the intermediate wall 20 for the purpose of transferring an illuminated image present at the opening 14 of the housing 12 (FIG. 1) to photosensitive material, such as the film unit 76, located in an exposure position adjacent the intermediate wall opening 26. Microlens assembly 34 moves from its initial position, shown in FIG. 8A, through its scanning mode, shown in FIG. 8B, and then to its end of scan or terminal position 8C from where it is subsequently returned to its initial position.

Figure 8A:
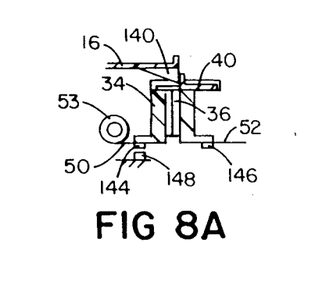
FIGS. 8A, 8B and 8C are sectional views taken on the line 8—8 in drawing FIG. 2, showing the microlens array at three different points in its image-transferring scanning cycle.
Figure 8B:
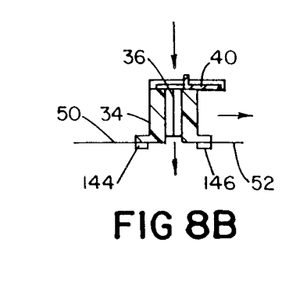
Figure 8C:
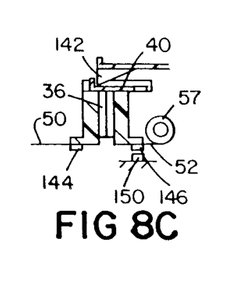

FIGS. 8A, 8B and 8C are partial sectional views taken on the line 8—8 in drawing FIG. 2 showing the lens assembly 34 at three different points in its image-transferring scanning cycle. With reference to FIGS. 8A, 8B and 8C, when the microlens assembly 34 is moved to its initial position as shown in Fig, 8A, the shade 50 is wound on the roll 53 and the lens assembly cover 40 engages a pair of fingers 140 (only one shown) projecting downward from the lower surface of the upper housing wall 16 adjacent the housing opening 14 (FIG. 1). Fingers 140 engage and subsequently cause the lens assembly cover 40 to be laterally moved to a position where it uncovers the illuminated-image facing ends of the microlens array 36 as the lens assembly 34 is moved to its initial position. When the microlens assembly 34 is moved from its initial position, as shown in FIG. 8A, and through its scanning mode, as shown in FIG. 8B, the illuminated-image facing ends of microlens array 36 are uncovered thereby enabling illuminated-image containing light rays to pass through the array 36. When the microlens assembly 34 is moved to its end of scan or terminal position, the shade 52 is wound on the roll 57 under the influence of its associated torsion-spring-biased support rod and the lens assembly cover 40 engages a pair of fingers 142 (only one shown) projecting downward from the lower surface of the upper housing wall 16 adjacent the housing opening 14, directly opposite the fingers 140. Fingers 142 engage and subsequently cause the lens assembly cover 40 to be moved to a position where it covers the illuminated-image facing ends of the microlens array 36 to thereby preclude any further passage of light therethrough. Cover 40 remains in its light precluding position until the lens assembly 34 is returned to its initial position and engages the cover moving fingers 140 at the opposite end of the opening 26, as previously explained.

It should be noted that the blockage of light to microlens array 36 can be achieved without the cover 40 in other, though less desirable, ways. For example, it is possible to design a transparency copier where an image is transferred for each direction of movement of the lens assembly 34. However, this type of copier would require more complex control of the spread roller system. In such an alternate copier, the lens assembly 34 would be driven well beyond the limits of the opening 26 in intermediate wall 20 so that the upper wall 16 or the non-registration of the microlens array 36 with the said opening 26 and photosensitive material present thereat, or both, could be employed to provide the light blocking function of the cover 40. In addition to the more complex control of the spread roller system, another disadvantage would be the requirement that the size of the housing 12 grow in order to accommodate this increased lens assembly 34 movement and therefore is less acceptable for incorporation in a compact transparency copier than the preferred arrangement employing the cover 40, described above.

In addition, means are provided for generating electrical signals representative of the positioning of the lens assembly 34 to either its initial or end of scan positions. A pair of miniature magnets 144 and 146 are mounted on the base of lens assembly 34. When the lens assembly 34 is moved to its initial position, the magnet 144 is moved adjacent a Hall Effect magnetic switch 148, causing the switch 148 to generate an electrical signal indicating that the lens assembly 34 is in its initial position. Similarly, when the lens assembly 34 is moved to its terminal or end of scan position, the magnet 146 is moved adjacent a Hall Effect magnetic switch 150, causing the switch 150 to generate an electrical signal indicating that the lens assembly 34 is in its end of scan position.

Figure 9:
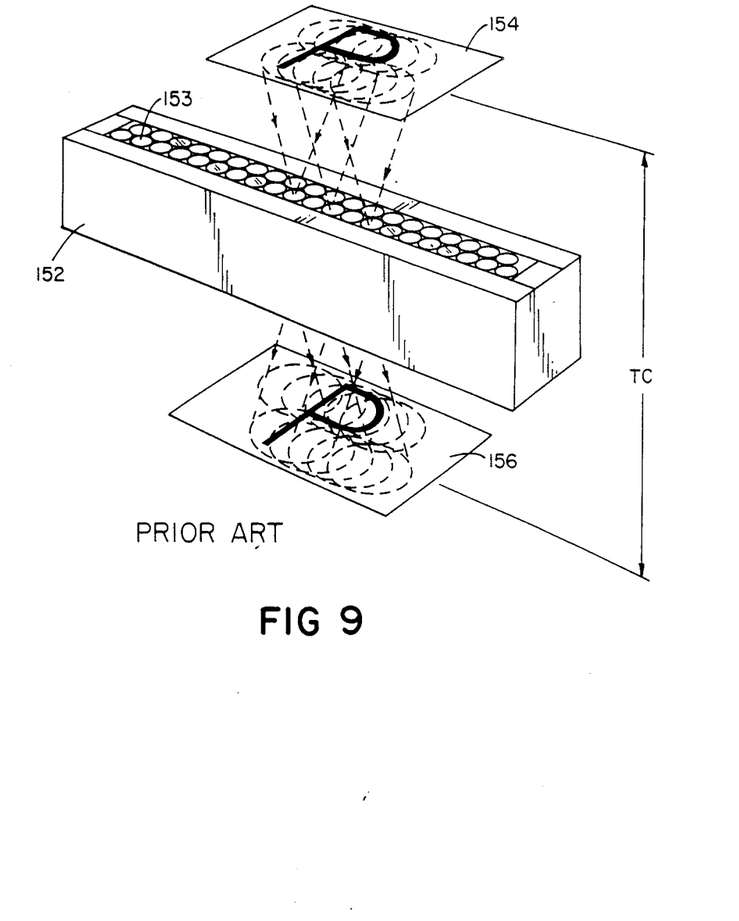
FIG. 9 is a perspective view of a commercially available microlens array of the type employed in the present invention.

As noted above, the lens array 36 is a commercially available lens strip comprised of a plurality of miniature, image-forming cylindrical lenses that are optically aligned and rigidly mounted with respect to one another. The typical lens array is comprised of one or two rows of graded-index microlenses, each with equal dimensions and optical properties. Prior art FIG. 9 is a perspective view of a commercially available lens assembly 152 incorporating a microlens array 153 of the type employed in the present invention. As shown in FIG. 9, the lens array 153 includes object plane 154 spaced from the object end of the array 153 and an image plane 156 spaced from the image or other end of the array 153. An illuminated image of, for example, the letter P placed at the object plane 154 of the array 153 will be transferred to the image plane 156 by the lens array 153. The transferred image is erect (non-inverted in each of two mutually perpendicular directions) and the ratio between the size of the image at the object plane 154 and the size of the image at the image plane 156 is preferably one-to-one. The total conjugate TC, which is the distance between the object plane 154 and the image plane 156, is a matter of design choice and is primarily determined by the size of the copying apparatus housing in which it is to be employed. In the present invention, TC for the microlens array 36 is chosen such that its object plane can be located substantially coincident with the plane defined by the surface 19 of the filter frame 18 and such that its image plane can be located substantially coincident with the focal plane within the copier housing 12. It should be noted that the surface defining the plane wherein the illuminated transparent image is located for copying purposes has been described herein as an outer surface 19 of the frame 18 of the demountable optical filter 17. Obviously, an integral housing surface or a projection of such a surface adjacent housing opening 14 could also be employed for such plane defining purposes. A disadvantage associated with employing these alternate surfaces for image defining purposes is their tendency to scratch and thereby damage a transparent image surface. It should also be noted that in the transparency copying apparatus 10, the distance between the object ends of the lens array 36 and their object plane and the distance between the image ends of the lens array 36 and their image plane is 0.307 inch.

OPERATION

Figure 10:
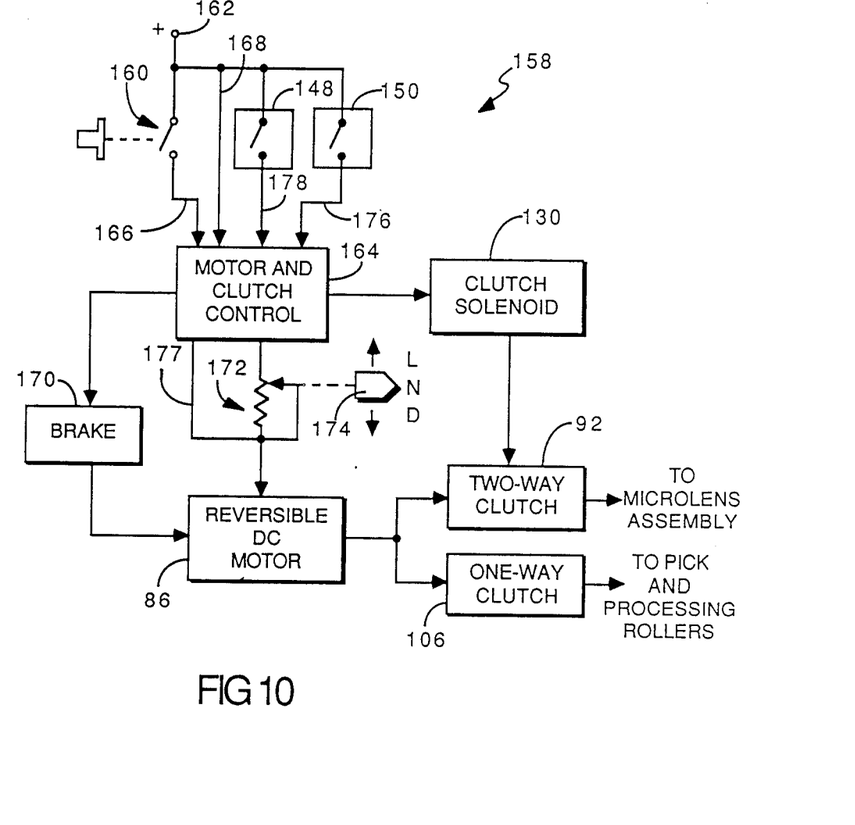
FIG. 10 is a schematic diagram of the control system for various exposure and processing functions within the compact copying apparatus of the present invention.

The sequence of operation of a typical illuminated-image transferral or copying cycle will now be described in detail. Reference is additionally made to FIG. 10 which is a schematic diagram of a control system 158, which controls various film exposure and processing functions within the illuminated-image copying apparatus 10. Prior to the initiation of a copying cycle, it is assumed that the film cassette 64 has been placed within the housing 12 with its film units 72 in position for their sequential exposure, that the two-way clutch 92 is in its uncoupled state, and that the lens assembly 34 is in its initial position with the cover member 40 in its light unblocking position and with the magnetic switch 148 in its closed or initial position indicating state, at the end of the intermediate wall opening 26 near the processing roller pair 108.

In order to produce a photographic image of an existing image formed on a film transparency (not shown), the opening 14 of the housing 12 having the neutral density filter 18 inserted therein is manually placed over a selected portion of the film transparency, thus locating the transparency in the object plane of the lens array 36. The film transparency is lighted from the rear with the illumination preferably being provided by a fluorescent light source. An operator manually depresses a switch 160 and momentarily couples a source of electrical power (not shown) connected to terminal 162, to a motor and clutch control 164 through a path 166. The source of electrical power is preferably a replaceable lithium battery contained within the copier housing 12. However, a rechargeable battery may also be employed. When the switch 160 is released, power to the motor and clutch control 164 is maintained through a path 168 and a latch circuit (not shown) within the control 164. The motor and clutch control 164 subsequently actuates the clutch solenoid 130 that, in turn, actuates the two-way clutch 92 from its uncoupled to its coupled state and also releases a motor rotation preventing brake 170 from the rotor of the reversible DC motor 86.

After the clutch 92 has been actuated to its coupled state and the brake 170 has been released, the motor and clutch control 164 energizes the reversible DC motor 86 through a variable speed-controlling resistor 172. As described above, the rotational motion of the motor 86 is coupled to the lens assembly 34 through the clutch 92, causing the lens assembly 34 to move or scan across the 3.2 inch length of the opening 26 in the intermediate wall 20, at a constant rate, to thereby transfer an image of the illuminated film transparency present at the housing opening 14 adjacent to the filter 17 to the light sensitive surface of the film unit 76 located at the image plane of the lens array 36. The shades 50 and 52 simultaneously wind and rewind under the influence of their associated torsion-spring-biased support rods as the lens assembly 34 is driven across the opening 26 to insure that the only light entering lighttight housing chamber 24 is through the microlens array 36.

The variable speed-controlling resistor 172 which is mechanically coupled to an operator adjustable speed-controlling lever 174 (FIG. 1) is slidably mounted on the outer surface of the upper wall 16 of the copier housing 12. Motor 86 can be varied by the lever 174 from a speed where it takes 300 ms (lever position L) to traverse the 3.2 inch length of the opening 26 to a speed where the traverse takes 700 ms (lever position D), but is preferably set to an intermediate scan time of 500 ms. When the faster scan times are employed to copy a transparent image illuminated by a fluorescent light source a fluorescent light induced, distorted image will often times result. This distortion can be corrected by making the filter 17 a light-attenuating neutral density filter that reduces the intensity of the illuminated image by the required number of stops. A light intensity reducing filter allows slower scan times to be employed and thereby avoids this image-distortion problem. 0.3 stop and 0.6 stop neutral density filters have been successfully employed for such purposes. It should be noted that in many instances the image to be copied may not be over-illuminated and therefore a light-attenuating or stop-reducing filter would not be required. However, even if a light-attenuating filter is not required, the frame 18 would still be employed to establish the object plane and the filter 17 would be replaced by a medium, such as plain window glass, that would not attenuate light intensity, yet insure that foreign matter would not enter the housing 12.

When the lens assembly 34 is driven into its terminal or end-of-scan position after a single one-way traverse of the opening 26, as shown in FIG. 8C, the fingers 142 engage and then, as explained above, move the lens assembly cover 40 to a position where it precludes any further passage of light through the lens array 36. In addition, when the lens assembly 34 reaches its end-of-scan position, the magnetic switch 150 is actuated to its closed position by the lens assembly mounted magnet 146 thereby generating a terminal or end-of-scan lens position signal which is routed to the motor and clutch control 164 through a path 176. Upon receipt of this end-of-scan signal, the motor and clutch control 164 de-energizes the motor 86 and interrupts power to the brake 170 to thereby arrest the rotational motion of the rotor of DC motor 86. Brake 170 is spring-force biased to its applied position and therefore interrupting power to the brake 170 causes the brake to be applied to the rotor of the DC motor 86. Motor and clutch control 164 then releases the brake 170 and starts the motor 86 rotating in its reverse direction. DC motor 86 is energized for reverse rotation through a path 177, bypassing the speed-controlling resistor 174, so that the rotation of the processing roller pair 108 coupled thereto is at the required, predetermined rate of rotation, unaffected by the position of the manually operated lever 174.

Microlens assembly 34, which is still coupled to the motor 86 through the two-way clutch 92, is then driven from its terminal or end-of-scan position back towards its initial position by the drive motor 86. When the lens assembly 34 is driven into its initial position, as shown in FIG. 8A, the fingers 140 engage and then, as explained above, move the lens assembly cover 40 to a position where it uncovers the illuminated-image facing ends of the microlens array 36 thereby enabling the passage of light rays through the microlens array 36 during the next lens assembly 34 scan. In addition, when the lens assembly 34 reaches its initial position, the magnetic switch 148 is actuated to its closed position by the lens assembly mounted magnet 144 and thereby generates an initial lens position signal which is routed to the motor and clutch control 164 through the path 178. Upon receipt of this initial lens position signal, the motor and clutch control 164 de-energizes the clutch solenoid 130 thus causing the two-way clutch 92 to be actuated to its uncoupled state and thereby terminate the movement of the lens assembly 34 by the drive motor 86.

Also, when the motor 86 is energized to rotate in its reverse direction, the rotational motion of the motor 86 is coupled to the processing or spread rollers 108 and to the film unit moving arm or pick 110 through the one-way clutch 106 and portions of the gear train 114. Pick 110 moves an exposed film unit into the bite of the spread rollers 108 to spread processing liquid contained within a rupturable pod across a layer of the exposed film unit to initiate the formation of a visible image within the film unit, as previously explained, and for the subsequent movement of the exposed film unit out into ambient light by the roller pair 108. Shortly after the processing liquid has been spread, a conventional gear train 114 actuated switch (not shown) within the motor and clutch control 164 interrupts the power to the drive motor 86 and the brake 170 to terminate the rotation of the processing roller pair 108.

From the foregoing description of the invention, it will be apparent to those skilled in the art that various improvements and modifications can be made in it without departing from its true scope. The embodiment described herein is merely illustrative and should not be viewed as the only embodiment that might encompass the invention.

What is claimed is:

1. Compact hand-held photographic apparatus for transferring an illuminated image to a focal plane located within said apparatus, comprising:

a housing having an opening therein and having a focal plane enclosed within said housing;
 means for supporting the illuminated image in a plane defined by an outer surface of a demountable projection of said housing, at said housing opening;
 an array of image transferring graded-index microlenses mounted for movement between an initial position and a terminal position across said housing opening, said microlens array including a plurality of microlenses, each of which includes an image end and an object end, with said image ends having a substantially common image plane located substantially coincident with said focal plane and said object ends having a common focal plane located substantially coincident with said outer housing surface defined plane, said focal and said outer surface planes being located substantially within said apparatus;
 means for forming a relatively-movable lighttight seal between said microlens array and structure forming said housing opening;
 means for precluding the transmission of illuminated-image light by said microlens array when said array is positioned to either it said initial or its said terminal positions; and
 means coupled to said microlens array for driving said array across said housing opening from its said initial to its said terminal position to thereby transfer an illuminated image present at said housing opening to said focal plane.

2. A method of photographically copying an illuminated image with compact hand-held photographic apparatus, comprising the steps of:

providing a lighttight housing having an opening therein and having means for locating photosensitive material at a focal plane within the housing;
 locating the illuminated image in a plane defined by an outer surface of a demountable projection of the housing, at the housing opening;
 mounting an array of image-transferring graded-index microlenses for movement between an initial position and a terminal position across the housing opening, the microlens array including a plurality of microlenses, each of which includes an image end and an object end, with the image ends having a substantially common image plane located substantially coincident with the focal plane and the object ends having a common focal plane located substantially coincident with outer housing surface defined plane, the focal and the outer surface planes being located substantially within the housing;
 precluding the transmission of illuminated-image light by the microlenses when the array is positioned to either its initial or its terminal positions;
 forming a relatively-movable lighttight seal between the microlens array and structure forming the housing opening; and
 driving the microlens array across the housing opening from its initial to its terminal position to thereby transfer an illuminated image present at the outer housing surface plane through the microlens array to the focal plane and to the photosensitive material located thereat.

3. Hand held compact apparatus for photographically copying an illuminated image, comprising:

a housing having means defining an opening therein through which image-bearing light may enter;

means for locating photosensitive material at a first plane within said housing;

means for defining a second plane in which the illuminated image is to be located for copying;

an image-transferring array mounted within said housing, said array including a support structure and a plurality of lenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across aid opening between an initial position and a terminal position to thereby transfer an illuminated image present at said second plane to the photosensitive material located at said first plane;

means for forming a relatively movable lighttight seal between sides of said array and said opening as said array is moved between said initial and terminal positions, said relatively movable lighttight seal comprising a flexible light-blocking shade member attached to said support structure in a lighttight relation and to said housing at opposite ends of said housing opening by self-retracting, shade member tensioning means such that said shade member is maintained in lighttight sliding engagement with that portion of said housing immediately adjacent said housing opening when said lens array is driven between its said initial and terminal positions; and a pair of labyrinth defining flanges mounted in a fixed relation on opposite sides of said housing opening for sliding engagement with the sides of said shade member in a lighttight relation.

4. Hand held compact apparatus for photographically copying an illuminated image, comprising:

a housing having means defining an opening therein through which imagebearing light may enter;

means for locating photosensitive material at a first plane within said housing;

means for defining a second plane in which the illuminated images is to be located for copying;

an image-transferring array mounted within said housing, said array including a plurality of lenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane;

means for forming a relatively movable lighttight seal between sides of said array and said opening as said array is moved between said initial and terminal positions; and an optical fiber demountably located in said housing opening, said filter including a support frame projecting outwardly of said housing opening and said second plane defining surface is formed by an outwardly facing surface of said support frame.

5. Hand held compact apparatus for photographically copying an illuminated image, comprising:

a housing having means defining an opening therein through which imagebearing light may enter, said opening having means adapted to receive an optical filter;

an optical filter demountably located in said housing opening;

means for locating photosensitive material at a first plane within said housing;

means for defining a second plane in which the illuminated image is to be located for copying, said second plane defining means comprising an external surface of said housing adjacent said housing opening;

an image-transferring array mounted within said housing, said array including a plurality of lenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane; and means for forming a relatively movable lighttight seal between sides of said array and said opening as said array is moved between said initial and terminal positions.

6. Hand held compact apparatus for photographically copying an illuminated image, comprising:

a housing having means defining an opening therein through which imagebearing light may enter, said housing opening including means adapted to receive an optical filter;

an optical filter demountably located in said housing opening;

means for locating photosensitive material at a first plane within said housing;

means for defining a second plane in which the illuminated image is to be located by copying, said second plane defining means comprising an outwardly extending projection adjacent said housing opening having an outwardly facing surface that establishes said second plane;

an image-transferring array mounted within said housing, said array including a plurality of lenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane; and means for forming a relatively movable lighttight seal between sides of said array and said opening as said array is moved between said initial and terminal positions.

7. Hand held compact apparatus for photographically copying an illuminated image, comprising:
- a housing having means defining an opening therein through which imagebearing light may enter;
- means for locating photosensitive material at a first plane within said housing;
- means for defining a second plane in which the illuminated image is to be located for copying;
- an image-transferring array mounted within said housing, said array including a plurality of lenses each of which includes an image end and an object end, with said image ends having a substantially common image plane located substantially coincident with said first plane and said object ends having a common focal plane located substantially coincident with said second plane, said first and second planes being located substantially within the confines of said apparatus;
- drive means for moving said array across said opening between an initial position and a terminal position in either of two directions to thereby transfer an illuminated image present at said second plane to the photosensitive material located at said first plane, said drive means including,
- means for sensing the positioning of said lens array to its said initial position and for generating a signal representative thereof,
- means for sensing the positioning of said lens array to its said terminal position and for generating a signal representative thereof,
- a two-way clutch actuatable between coupled and uncoupled states for coupling said drive means to said lens array for movement of said lens array between its said initial terminal positions,
- means responsive to the actuation of said drive means for generating a signal representative thereof,
- means responsive to said drive means actuation signal for actuating said two-way clutch from its said uncoupled to its said coupled state,
- means coupled to said drive means and responsive to said lens array terminal position signal for reversing the drive direction of said drive means, and
- means responsive to said lens array initial position signal for actuating said two-way clutch from its said coupled to its said uncoupled state;
- means for locating a plurality of instant film units contained in a film cassette in position for their sequential exposure at said housing focal plane;
- film advancing means mounted adjacent said locating means for movement into engagement with a film unit located in said exposure position so as to move the film unit subsequent to exposure, through an exit slot in the film cassette;
- a light-sealed housing slot through which an exposed film unit is adapted to be advanced into ambient light;
- a pair of juxtaposed rollers mounted adjacent said locating means in position to receive the exposed film unit therebetween as it exits from the film cassette, to process same through the progressive compression thereof and to advance the processed film unit through said housing slot;
- means coupling said advancing means and at least one of said rollers to said drive means wherein the actuation of said drive means causes an exposed instant film unit located in said exposure position to be processed and subsequently advanced through said light-sealed housing slot; and
- means responsive to the rotation of said drive means for terminating the movement thereof subsequent to the movement of the exposed film unit between said rollers.

8. The apparatus of claim 7, wherein said drive means includes a rotor and said means coupling said advancing means and said roller to said drive means includes a one-way clutch connected between said rotor and both said advancing means and said roller for uncoupling said drive means from both said advancing means and said roller when said rotor is driven in one of said two rotor directions and for coupling said drive means to both said advancing means and said roller when said rotor is driven in the other of said two rotor directions.

9. Hand held compact apparatus for photographically copying an illuminated image, comprising:
- a housing having means defining an opening therein through which imagebearing light may enter;
- means for locating photosensitive material at a first plane within said housing;
- means for defining a second plane in which the illuminated image is to be located for copying;
- an image-transferring array mounted within said housing, said array including a support structure and a plurality of lenses each of which includes an image end and an object end, with said image ends having a substantially common image plane located substantially coincident with said first plane and said object ends having a common focal plane located substantially coincident with said second plane, said first and second planes being located substantially within the confines of said apparatus;
- means for moving said array across said opening between an initial position and a terminal position to thereby transfer an illuminated image present at said second plane to the photosensitive material located at said first plane;
- means for forming a relatively movable lighttight seal between sides of said array and said opening as said array is moved between said initial and terminal positions;
- a cover member mounted for movement with said lens array and movable between a position where it blocks the transmission of light by said lens array and a position where it unblocks such transmission, at least two portions of said cover member are adapted to slidably engage said support structure and a spring is formed in each of said cover member portions to provide frictional coupling between said cover member and said support structure and thereby positively maintain said cover member in either its said light blocking or light unblocking positions; and
- means mounted adjacent said housing opening for engaging and thereby displacing said cover member from its said blocking position to its said unblocking position as said optical array enters said initial position and from its said unblocking position to its said blocking position as said optical array enters said terminal position.

10. Hand held compact apparatus for photographically copying an illuminated image, comprising:
- a housing having means defining an opening therein through which imagebearing light may enter;
- means for locating photosensitive material at a first plane within said housing;

means for defining a second plane in which the illuminated images is to be located for copying;

an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus and said microlens array includes an array supported structure;

means for moving said array across said opening between an initial position and a terminal position to thereby transfer an illuminated image present at said second plane to the photosensitive material located at said first plane; and means for forming a relatively movable lighttight seal between sides of said array and said opening as said array is moved between said initial and terminal positions comprising a flexible light-blocking shade member attached to said support structure in a lighttight relation and to said housing at opposite ends of said housing opening by self-retracting, shade member torsioning means such that said shade member is maintained in lighttight sliding engagement with that portion of said housing immediately adjacent said housing opening when said microlens array is driven between its said initial and terminal positions.

11. Hand held compact apparatus for photographically copying an illuminated image, comprising:

a housing having means defining an opening therein through which imagebearing light may enter;

means for locating photosensitive material at a first plane within said housing;

means for defining a second plane in which the illuminated images is to be located for copying;

an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane wherein the rate at which said microlens array is driven across said housing opening by said drive means for image-transferring purposes is manually variable over a range of microlens array drive rates; and means for forming a relatively movable lighttight seal between sides of said array and said opening as said array is moved between said initial and terminal positions.

12. Hand held compact apparatus for photographically copying an illuminated image, comprising:

a housing having means defining an opening therein through which imagebearing light may enter;

means for locating photosensitive material at a first plane within said housing;

means for defining a second plane in which the illuminated image is to be located for copying, said second plane defining means comprising an external surface of said housing adjacent said housing opening;

an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane; and means for forming a relatively movable lighttight seal between sides of said array and said opening as said array is moved between said initial and terminal positions.

13. Hand held compact apparatus for photographically copying an illuminated image, comprising:

a housing having means defining an opening therein through which imagebearing light may enter, and having an outwardly extending projection adjacent said housing opening;

means for locating photosensitive material at a first plane within said housing;

means for defining a second plane in which the illuminated image is to be located for copying comprising an outwardly facing surface of said housing projections;

an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane; and means for forming a relatively movable lighttight seal between sides of said array and said opening as said array is moved between said initial and terminal positions.

14. Hand held compact apparatus for photographically copying an illuminated image, comprising:

a housing having means defining an opening therein through which imagebearing light may enter;

means for locating photosensitive material at a first plane within said housing;

means for defining a second plane in which the illuminated image is to be located for copying;

an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane, wherein said microlens array is located out of alignment with said housing opening when positioned in either of said initial or terminal positions;

means for precluding the transmission of illuminated-image light by said microlens array when said array is in either said initial or terminal positions; and means for forming a relatively movable lighttight seal between sides of said array and said opening as said array is moved between said initial and terminal positions.

15. Hand held compact apparatus for photographically copying an illuminated image, comprising:
 a housing having means defining an opening therein through which imagebearing light may enter;
 means for locating photosensitive material at a first plane within said housing;
 means for defining a second plane in which the illuminated image is to be located for copying;
 an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus; and
 drive means for moving said array across said opening between an initial position and a terminal position to thereby transfer an illuminated image present at said second plane to the photosensitive material located at said first plane comprising,
 means for sensing the positioning of said microlens array to its said initial position and for generating a signal representative thereof,
 means for sensing the positioning of said microlens array to its said terminal position and for generating a signal representative thereof,
 a two-way clutch actuatable between coupled and uncoupled states for coupling said drive means to said microlens array for movement of said microlens array between its said initial and terminal positions,
 means responsive to the actuation of said drive means for generating a signal representative thereof,
 means responsive to said drive means actuation signal for actuating said two-way clutch from its said uncoupled to its said coupled state,
 means coupled to said drive means and responsive to said microlens array terminal position signal for reversing the drive direction of said drive means,
 means responsive to said microlens array initial position signal for actuating said two-way clutch from its said coupled to its said uncoupled state, and means for forming a relatively movable lighttight seal between sides of said array and said opening as said array is moved between said initial and terminal positions.

16. Hand held compact apparatus for photographically copying an illuminated image, comprising:
 a housing having means defining an opening therein through which imagebearing light may enter;
 means for locating photosensitive material at a first plane within said housing;
 means for defining a second plane in which the illuminated image is to be located for copying;
 an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;
 means for moving said array cross said opening between an initial position and a terminal position to thereby transfer an illuminated image present at said second plane to the photosensitive material located at said first plane;
 means for forming a relatively movable lighttight seal between sides of said array and said opening as said array is moved between said initial and terminal positions;
 a cover member mounted for movement with said microlens array and movable between a position where it blocks the transmission of light by said microlens array and a position where it unblocks such transmission; and
 means mounted adjacent said housing opening for engaging and thereby displacing said cover member from its said blocking position to its said unblocking position as said microlens array enters said initial position and from its said unblocking position to its said blocking position as said microlens array enters said terminal position.

17. Hand held compact apparatus for photographically copying an illuminated image, comprising:
 a housing having means defining an opening therein through which imagebearing light may enter;
 means for locating photosensitive material at a first plane within said housing;
 means for defining a second plane in which the illuminated image is to be located for copying;
 an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;
 means for moving said array across said opening between an initial position and a terminal position to thereby transfer an illuminated image present at said second plane to the photosensitive material located at said first plane;
 means for forming a relatively movable lighttight seal between sides of said array and said opening as said array is moved between said initial and terminal positions;

a cover member mounted for movement with said microlens array and movable between a position where it blocks the transmission of light by said microlens array and a position where it unblocks such transmission; and means mounted adjacent said housing opening for engaging and thereby displacing said cover member from its said blocking position to its said unblocking position as said microlens array enters said initial position and from its said unblocking position to its said blocking position as said microlens array enters said terminal position; and means for positively maintaining said cover member in its said light blocking position when said microlens array is moved form its said terminal position to its said initial position, and for positively maintaining said cover member in said unblocking position where said microlens array is moved from said initial position to said terminal position.

18. Hand held compact apparatus for photographically copying an illuminated image, comprising:

a housing having means defining an opening therein through which imagebearing light may enter;

means for locating photosensitive material at a first plane within said housing;

means for defining a second plane in which the illuminated image is to be located for copying;

an image-transferring array mounted within said housing, said array including a plurality of graded-index microlenses each of which includes an image end and an object end, with said image ends having a substantially common image plane located substantially coincident with said first plane and said object ends having a common focal plane located substantially coincident with said second plane, said first and second planes being located substantially within the confines of said apparatus;

means for moving said array across said opening between an initial position and a terminal position to thereby transfer an illuminated image present at said second plane to the photosensitive material located at said first plane;

means for forming a relatively movable lighttight seal between sides of said array and said opening as said array is moved between said initial and terminal positions;

a cover member mounted for movement with said microlens array and movable between a position where it blocks the transmission of light by said microlens array and a position where it unblocks such transmission;

means mounted adjacent said housing opening for engaging and thereby displacing said cover member from its said blocking position to its said unblocking position as said microlens array enter said initial position and from its said unblocking position to its said blocking position as said microlens array enters said terminal position; and means for positively maintaining said cover member in its said light blocking position when said microlens array is moved form its said terminal position to its said initial position, and for positively maintaining said cover member in said unblocking position when said microlens array is moved from said initial position to said terminal position, wherein said microlens array includes support structure for movement therewith, at least two portions of said cover member are adapted to slidably engage said support structure and a spring is provided at one of said cover member portions to provide frictional coupling between said cover member and said support structure and thereby positively maintain said cover member in either its said light blocking or light unblocking positions.

* * * * *